April 27, 1954    S. SHALER    2,676,401
SELF-ADJUSTING PINKING SHEARS
Filed March 16, 1950    2 Sheets-Sheet 1
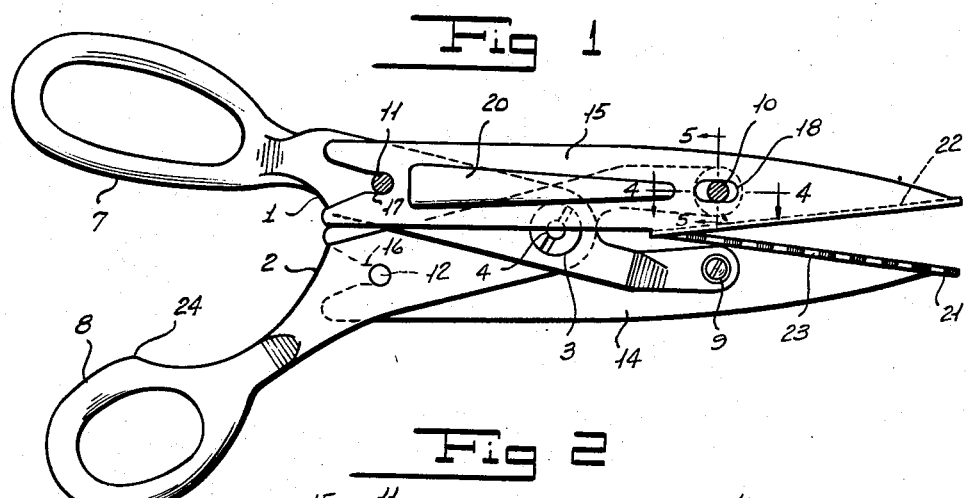
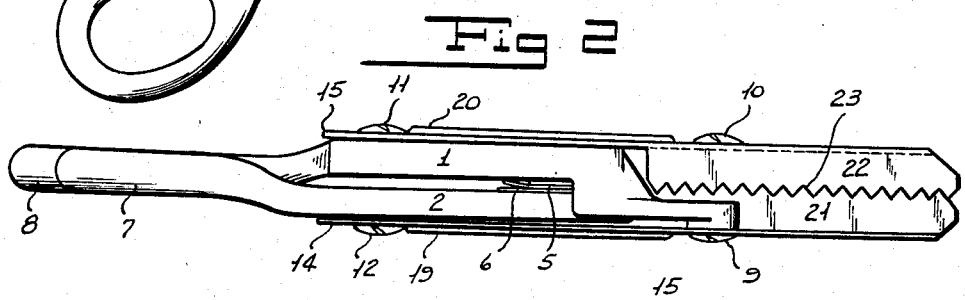
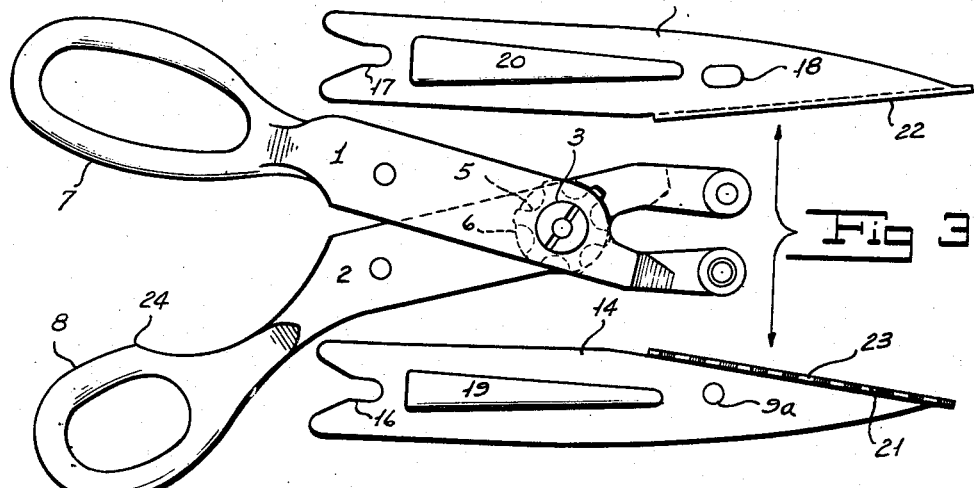
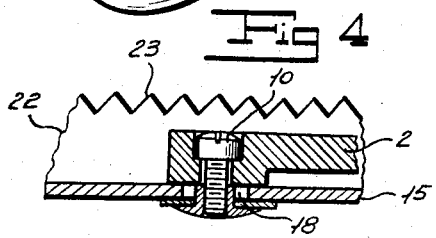
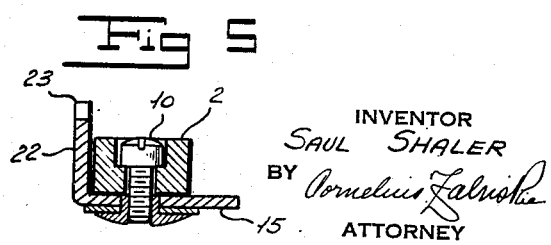
INVENTOR
SAUL SHALER
BY
ATTORNEY April 27, 1954  S. SHALER  2,676,401
SELF-ADJUSTING PINKING SHEARS
Filed March 16, 1950  2 Sheets-Sheet 2
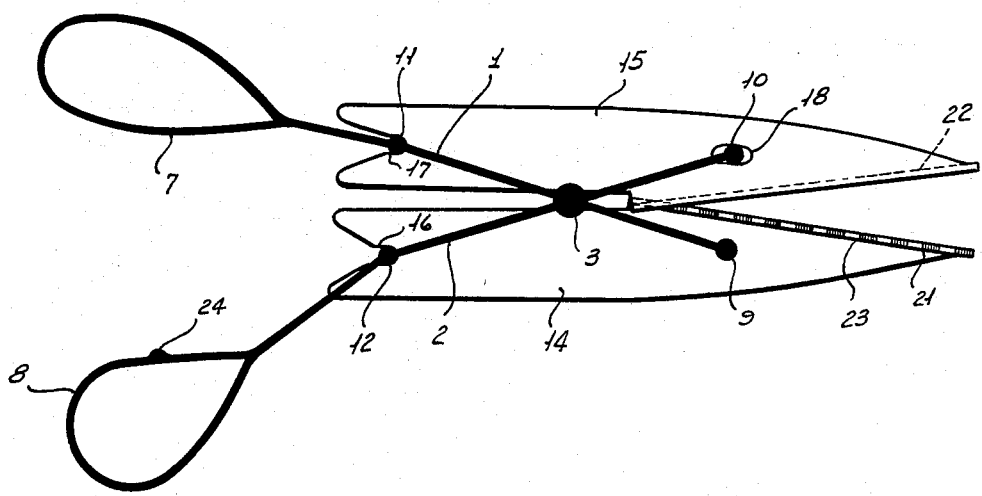
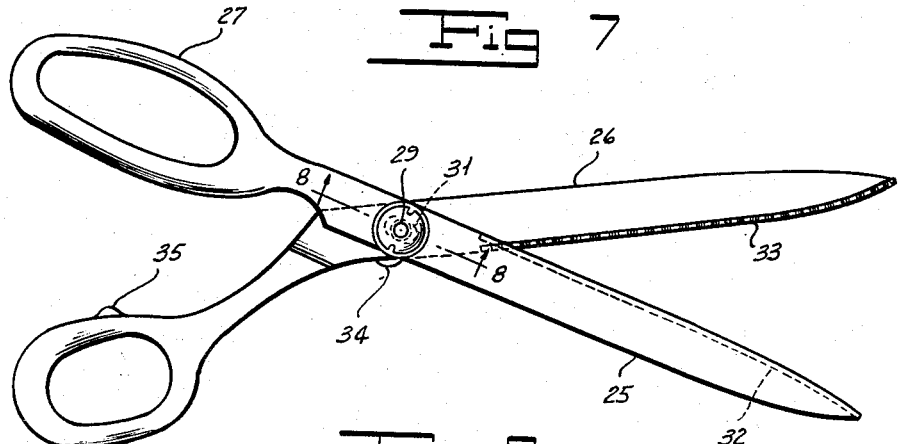
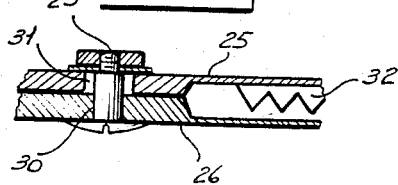
INVENTOR
SAUL SHALER
BY
Cornelius Zabriskie
ATTORNEY Patented Apr. 27, 1954

2,676,401

UNITED STATES PATENT OFFICE 2,676,401

SELF-ADJUSTING PINKING SHEARS

Saul Shaler, Jackson Heights, N. Y.

Application March 16, 1950, Serial No. 149,921

10 Claims. (Cl. 30—230)

This invention relates to pinking shears and its fundamental concept is such that it may be embodied in shears having blades operable by compound action, as exemplified by J. P. Nikonow et al. Patent No. 2,290,203, as well as to single action shears, exemplified by C. Weidauer Patent No. 1,970,408.

Both of the foregoing types of shears embody serrated blades adapted to cut by interfitting articulation. They depend for efficient operation upon accurate interfitting coaction between the successive teeth of the two blades. In order to so operate, prior practice has required that the cutting teeth of the serrations of the two blades be machined and lapped with great exactness to conform with one another in succession. This is such an expensive procedure that only high priced shears could be expected to cut properly.

Attempts have been made to manufacture pinking shears without such precision in their making, but the resulting shears have not been efficient. They generally cut one kind of fabric and tear or fray other kinds, or they cut for one or more portions of the length of the cutting jaws and fail to cut well for the remainder thereof. In most cases, the defect is attributable to the machining of the cutting teeth, either alone or together with faulty location of the fulcrum pivots.

One helpful achievement prior to the advent of this invention consisted in utilizing an eccentric pivotal connection between the blades, whereby such blades might be manually rectilinearly adjusted relative to one another into the most effective relation and then permanently locked in this relation. That improvement produced an optimum condition wherein the shears gave the best overall performance, even though this might be far from perfect.

I have conceived a simple but far reaching improvement in pinking shears whereby they may be manufactured by expeditious quantity production methods within reasonable production tolerances and so assembled that each and every portion of the blades will function with maximum efficiency on fabrics or other materials of all kinds and weights. I accomplish this result by the use of what I term "captive" and "follower" blades mounted in pivotal relation and having toothed cutting edges adapted to traverse one another when associated handles are operated. The so-called captive blade is "captive" with respect to one of the handles, while the follower blade is longitudinally movable with respect to the captive blade, i. e., it "follows" the captive blade and is moved by the latter as the teeth of the two blades successively mesh during the operation of the handles.

In accordance with this invention, the follower blade has a "floating" mounting and its position of relative longitudinal movement is at all times determined by its particular tooth or teeth which is or are in mesh with the corresponding tooth or teeth of the other blade. Consequently the co-operating teeth of the two blades are free to individually "find" the best interfitting relation between themselves and are thus automatically self-centering as the jaws of the shears are opened and closed. This is so even though the size and spacing of successive teeth of either or both blades may not be truly uniform.

Features of the invention, other than those adverted to, will be apparent from the hereinafter detailed description and appended claims when read in conjunction with the accompanying drawings.

The accompanying drawings illustrate different practical embodiments of the invention, but the constructions therein shown are to be understood as illustrative only and not as defining the limits of the invention.

Figure 1 is a face view of compound action shears embodying the present invention. In this view the heads of certain pins are cut off to better show their relation to the blades.

Figure 2 is a side elevation of the shears as shown in Figure 1.

Figure 3 is a face view with the blades removed to more clearly illustrate the pivotal and blade guiding connections between the parts.

Figure 4 is a fragmental section on the line 4—4 of Figure 1.

Figure 5 is a like section on the line 5—5 of Figure 1.

Figure 6 is a diagrammatic showing of the shears shown in the preceding figures and illustrates in a graphic manner the pivotal and guiding connections between the respective parts of the shears.

Figure 7 is a face view of single action shears embodying the present invention.

Figure 8 is a fragmental section on the line 8—8 of Figure 7 with the jaws fully closed.

Referring first to the compound action shears illustrated in Figures 1-6, inclusive, 1 and 2 designate two operating levers, fulcrumed to one another by a fulcrum pivot 3. The details of this pivot are not important and may be varied within wide limits. For the purpose of illustration, the pivot is shown in the form of a bolt 4, which may be adjusted to place under desired stress a spring washer 5 positioned between the levers and having an underlying flat washer 6. The levers are provided with appropriate handles 7 and 8 such as are commonly found on shears and through the manipulation of which relative pivotal movement is imparted to the levers.

Positioned near the forward ends of the levers 1 and 2 are guide pins 9 and 10 and said levers also carry guide pins 11 and 12 positioned between the fulcrum pivot 3 and the handles. The pivot pin 9 is shown as spaced from the fulcrum pivot 3 a distance equal to the spacing of the pin 10 from such pivot. Likewise the pin 11 is shown as spaced from the pivot 3 the same distance as the pin 12. However, the spacing of the pins 11 and 12 from the fulcrum pin 3 is shown as somewhat greater than the spacing of the pins 9 and 10 from such fulcrum pin. However, the particular spacing of these pins may be changed without departing from this invention, since, in any event, the floating character of the follower blade 15 will permit the self-centering of the teeth as they successively coact with one another.

Mounted on the pins 9 and 12 is a so-called captive blade 14, while mounted on the pins 10 and 11 is a follower blade 15. Figure 6 of the drawings schematically illustrates the relation of these parts. The blades are secured to the levers by the pins 9, 10, 11 and 12 which may be of any appropriate construction, although, by preference, bolts with stepped heads or shouldered screws are employed for this purpose, so that the pins may be rigidly secured to the levers, while permitting pivotal or sliding movement or both, as the case may be, between the blades and the levers.

In this construction, the pin 9 passes through a close fitting circular perforation 9a in the captive blade 14 which is thus secured to the forward end of the lever 1 and thereby made captive against longitudinal movement relative thereto. The pin 12, however, extends through an elongated slot 16 in the rear end of the blade 14, so as to permit of pivotal movement between the levers and between the levers and the captive blade 14.

The rear end of the follower blade 15 has a slot 17 coacting with the pin 11 in the same manner as the pin 12 coacts with the slot 16, but the pin 10 at the forward end of the lever 2 passes through an elongated slot 18 in this blade. The pins 10 and 11 thus support the follower blade for longitudinal rectilinear movement relative to and in contradistinction to the captive blade 14 which is secured against longitudinal movement by the close fitting connecting pin 9.

In practice I preferably stamp the blades 14 and 15 from sheet metal of such thickness to impart adequate strength and durability. In this stamping operation, longitudinal bosses 19 and 20 may be formed on the blades, as shown in Figures 1–3, to longitudinally stiffen them. The portions of the blades, which constitute the jaws of the shears and are adapted to coact with one another in the carrying out of the cutting operation, are provided with bent up flanges 21 and 22. The longitudinal edges of these flanges are serrated, as shown at 23, to form a succession of sharp edged cutting teeth whereby pinking cuts are performed. When the parts are assembled, the relation of the cutting flanges 21 and 22, the spacing of the pins 9 and 12 and the depth of the slot 16 are such that the jaws may be opened only so far as shown in Figures 1 and 6, which leaves at least one tooth of one blade in mesh with at least one tooth of the other blade. With this arrangement the teeth of the two blades never leave meshing relation. At the start of the cut, certain teeth of both blades are in mesh and, as the cut proceeds, the successive teeth of both blades, from the rear end of the flanges 21 and 22 to the forward ends of said flanges, consecutively mesh with one another as they pass through one another in carrying out the cutting operation. At the end of the cut, at least one tooth of each blade remains in mesh with at least one tooth of the other blade, so that, when the jaws are opened again, the teeth of the two blades successively mesh with one another in reverse order as they return to initial, fully opened position of the jaws. Thus the pins 9 and 12 collectively act as a stop to limit the opening movement of the jaws of the shears, while a stop projection 24 on the handle 8 acts to limit the extent of closing movement by engagement with an adjacent portion of the handle 7.

During the opening and closing of the jaws as explained, the captive blade 14 moves with the lever 1 and is anchored against longitudinal movement relative thereto. However, by virtue of the slots 11 and 17 in the follower blade, this latter blade is free for longitudinal floating movement with respect to both the levers 1 and 2 and the blade 14. Such being the case, the position of the follower blade with respect to the pins 10 and 11 is controlled at all times by the interfitting relation of the particular teeth of the two jaws which are at that time in mesh. In other words, when any particular tooth of one blade is brought into mesh with the corresponding space between teeth of the other blade, that tooth will automatically center itself in said space and autogenously shift the follower blade sufficiently to permit this self-centering action to take place. As a consequence of this fact, either or both the shaping or spacing of the consecutive teeth of the two blades may be somewhat inaccurate and yet the self-centering of these teeth, as they cooperate with one another, will automatically compensate for such inaccuracy and permit said teeth to efficiently cut the material between them.

It will thus be manifest that by the simple expedient of mounting the two blades for relative longitudinal movement, the self-centering of the cutting teeth will automatically result and thus enable the corresponding individual teeth throughout the length of the two jaws to effectually cut, notwithstanding lack of uniformity between consecutive teeth of either or both jaws or slight misplacement of the fulcrum pivot of the shears. Consequently, the manufacture of such shears does not require close tolerances in order to obtain outstanding performance in operation.

In accordance with this invention it is essential that at least one of the blades be mounted for floating movement so that the blades be capable of autogenous relative longitudinal movement, as the jaws are opened and closed, to permit of the self-centering of the cutting teeth as described. If the blades were locked against such relative longitudinal movement, the self-centering feature of this invention could not be present. For example, if both blades were anchored to one another by a guide rod, as in the Nikonow et al. patent or by a pin close-fitting with both blades as in the Weidauer patent, both hereinbefore referred to, the relation of the teeth of the two blades would be fixed and predetermined during operation of the jaws and said teeth would be incapable of a self-centering operation according to the present invention.

While this invention was primarily conceived for incorporation into shears of the compound action type shown in Figures 1-6, said invention has utility in shears of the single action type, such as shown for example in Figures 7 and 8. In these latter figures, the shears embody blades 25 and 26 forming parts of levers having relatively rigid handles 27 and 28 and pivoted to one another by a fulcrum pivot 29. This pivot is illustrated as a bolt, although any other suitable fulcrum pivot construction may be used.

The fulcrum bolt 29, preferably a shouldered bolt, is shown best in Figure 8 as passing snugly through a circular hole 30 in the blade 26 and extending through an elongated slot 31 in the other blade 25. The blades are thus connected for pivotal movement while permitting relative longitudinal movement. The teeth of the serrated edges of the cutting flanges 32 and 33 are adapted to remain at all times in mesh as hereinbefore described, a stop 34 on the blade 26 serving to limit opening movement of the jaws and stop 35 on the handle 28 serving to limit their closing movement. Inasmuch as some teeth of both jaws are at all times in mesh, the consecutive teeth will self-center one another as the jaws are opened and closed, and the elongated slot 31 will permit the longitudinal shifting of the jaws relative to one another to allow of this self-centering of the cutting teeth in the same manner as hereinbefore explained.

I have hereinbefore referred to the interposition of the spring washer 5 between the operating levers and arranged coaxially of the fulcrum pivot 3. This spring washer is not essential to the operation of shears according to this invention, but I preferably incorporate it because I have found that its presence permits even greater tolerances in the manufacture and machining of the shear parts.

It will be apparent from the foregoing detailed description that, by mounting the two cutting blades of the shears for relative longitudinal movement and utilizing cooperating cutting teeth of the two blades to automatically relatively adjust the blades to effect self-centering of these teeth, I am able to accomplish cutting accuracy which could not possibly be obtained by either optimum manual adjustment of or fixed relation between the blades and this result is possible with ordinary production methods where tolerances are not always too close. I wish it understood, however, that the present invention may be incorporated to advantage even in high price shears made to close tolerances and lapped, for the incorporation of the invention in any shears wherein the cutting teeth do not leave mesh with one another will materially add to the cutting efficiency of the shears.

The foregoing detailed description sets forth the invention in its preferred practical form, but the invention is to be understood as fully commensurate with the appended claims.

Having thus fully described the invention, what I claim as new and desire to secure by Letters Patent is:

1. Compound action pinking shears comprising: cross levers fulcrumed where they cross and provided with handles, a captive blade pivotally connected to one lever on one side of the fulcrum and both pivotally and longitudinally slidably connected to the other lever on the opposite side of the fulcrum, and a follower blade both pivotally and longitudinally slidably connected to both levers on opposite sides of said fulcrum, whereby said follower blade is capable of free longitudinal movement relative to the captive blade, said blades having cutting teeth at all times in mesh and adapted to successively traverse one another when the levers are pivotally moved.

2. Pinking shears having toothed cutting blades with their teeth at all times in mesh, and means for connecting said blades for pivotal movement and for unrestricted relative longitudinal movement induced by the autogenous self-centering of the teeth of the respective blades as such teeth progressively mesh with one another during pivotal movement of the blades.

3. Pinking shears having toothed cutting blades with their teeth at all times in mesh, and means connecting said blades for both pivotal and unrestrained longitudinal movement relative to one another, whereby the teeth of said blades autogenously move one blade longitudinally with respect to othe other to the extent necessary to permit said teeth to center themselves as the teeth of one blade progressively mesh with the teeth of the other blade during pivotal movement of the blades.

4. Pinking shears comprising: a captive blade and a follower blade pivotally connected and having teeth meshing at all times, and handles for causing said teeth to progressively engage one another when the blades are pivotally moved relative to one another, the captive blade being anchored against longitudinal movement relative to one handle and the follower blade being mounted for unrestricted longitudinal movement relative to the captive blade, whereby the teeth of the follower blade autogenously move that blade longitudinally as they progressively mesh with the teeth of the captive blade during pivotal movement between said blades.

5. Pinking shears according to claim 4, wherein the follower blade is also longitudinally movable relative to both handles.

6. Compound action pinking shears comprising: cross levers fulcrumed where they cross and provided with handles, a pair of meshing toothed cutting blades, one blade having pivot and slot connections with both levers on opposite sides of said fulcrum and the other blade having a pivot connection with one lever on one side of the fulcrum and a pivot and slot connection with the other lever on the other side of the fulcrum to mount said blades for both pivotal and free relative longitudinal movement with respect to one another to permit the teeth of each blade to automatically center themselves with respect to the teeth of the other blade as they progressively mesh during pivotal movement of said levers.

7. Pinking shears comprising: blades having jaws with meshing toothed cutting edges adapted to traverse one another as said jaws are opened and closed, said blades being mounted for free longitudinal movement with respect to one another to permit autogenous self-centering of the corresponding cutting teeth of the jaws as said teeth successively mesh with one another during closing and opening movement of the jaws, crossed levers fulcrumed to one another where they cross and connected to the blades for operating the same.

8. Compound action pinking shears comprising: cross levers fulcrumed where they cross and provided with handles, a captive blade secured by a pivot to one lever on one side of the fulcrum and having a pivot and slot connection with the other lever on the opposite side of said fulcrum, and a follower blade secured to both levers on opposite sides of said fulcrum by pin and slot connections permitting said follower blade free longitudinal movement relative to the captive blade, said blades having cutting teeth which are at all times in mesh and are adapted to successively traverse one another when the levers are pivotally moved.

9. Pinking shears which comprise a pair of blades inclined to each other each having a row of teeth, said rows meshing with each other in shearing relation, handle members, and linkage means connecting said handle members to said blades said linkage means including a pair of pivotally connected arms each of which is movably connected to both blades, the points of connection being equidistant radially from the pivot point of said arms so as to move the blades laterally while holding the blades at approximately the same angle to each other, one of the connections of one arm to a blade being pivotal to prevent relative longitudinal movement of that blade while the correspondingly positioned connection of the other arm to its blade permits sufficient longitudinal movement of the other blade to maintain said teeth in proper mesh with each other.

10. Pinking shears which comprise a pair of handle members connected together by a pivot with stubs extending beyond said pivot, a pair of blades carrying rows of cutting teeth that intersect with each other in meshing relationship, said blades being pivotally connected to said members and stubs to move the blades laterally as the handles are worked, one of said pivotal connections preventing longitudinal movement of one of said blades and the corresponding pivotal connection between the other stub and blade permitting longitudinal movement of the other blade.

References Cited in the file of this patent

UNITED STATES PATENTS

| Number | Name | Date |
|---|---|---|
| Re. 23,503 | Carney | May 27, 1952 |
| 467,808 | Heinrichs | Jan. 26, 1892 |
| 846,854 | Jones | Mar. 12, 1907 |
| 1,107,227 | Ryan | Aug. 11, 1914 |
| 1,179,830 | Nayes | Apr. 18, 1916 |
| 1,918,889 | Bacon | July 18, 1933 |
| 1,970,408 | Weidauer | Aug. 14, 1934 |
| 2,048,170 | Sibley | July 21, 1936 |
| 2,290,203 | Nickonow | July 21, 1942 |
| 2,387,053 | Brown | Oct. 16, 1945 |
| 2,590,024 | Lieberman | Mar. 18, 1952 |